United States Patent [19]
Noguchi

[11] Patent Number: 5,689,369
[45] Date of Patent: Nov. 18, 1997

[54] ANGULAR DEVIATION DETECTION APPARATUS

[75] Inventor: Kazuhiro Noguchi, Kawasaki, Japan

[73] Assignee: Canon Kabushiki Kaisha, Tokyo, Japan

[21] Appl. No.: 763,444

[22] Filed: Dec. 11, 1996

Related U.S. Application Data

[63] Continuation of Ser. No. 364,724, Dec. 27, 1994, abandoned.

[30] Foreign Application Priority Data

Dec. 8, 1993 [JP] Japan .................................. 5-334361
Jul. 26, 1994 [JP] Japan .................................. 6-192688

[51] Int. Cl.$^6$ ........................... G02B 27/64; H04N 5/228
[52] U.S. Cl. ........................ 359/557; 348/208; 356/141.3
[58] Field of Search ........................ 359/554, 557; 356/141.3; 348/208

[56] References Cited

U.S. PATENT DOCUMENTS

| | | | |
|---|---|---|---|
| 3,486,826 | 12/1969 | Colvin et al. | 356/141.3 |
| 4,701,602 | 10/1987 | Schaefer et al. | |
| 5,020,369 | 6/1991 | Washisu et al. | |
| 5,117,246 | 5/1992 | Takahashi et al. | 354/202 |
| 5,153,633 | 10/1992 | Otani | 354/430 |
| 5,479,236 | 12/1995 | Tanaka | 354/430 |

FOREIGN PATENT DOCUMENTS 0063830  11/1982  European Pat. Off. .
61-212707  9/1986  Japan .

OTHER PUBLICATIONS

Patent Abstracts of Japan, vol. 11, No. 42 (P-545), Feb. 6, 1987.

*Primary Examiner*—Stephen C. Buczinski
*Attorney, Agent, or Firm*—Fitzpatrick, Cella, Harper & Scinto

[57] ABSTRACT

There is provided an angular deviation state detection apparatus which detects the deviation state of a movable portion which can deviate, and has a detection portion for detecting a predetermined angular deviation component of the movable portion without being influenced by a deviation component of the movable portion, which is different from the predetermined angular deviation component.

More specifically, a sensor which is constituted by light-emitting means for emitting a collimated light beam, and light-receiving means for receiving light emitted from the light-emitting means is adopted, or the deviation state of a specific portion, which is a portion of the movable portion and substantially does not cause the angular deviation component upon generation of the different deviation component, is detected.

With this arrangement, the angular deviation state of the movable portion can be accurately detected.

38 Claims, 14 Drawing Sheets

FIG. 18A
FIG. 18B
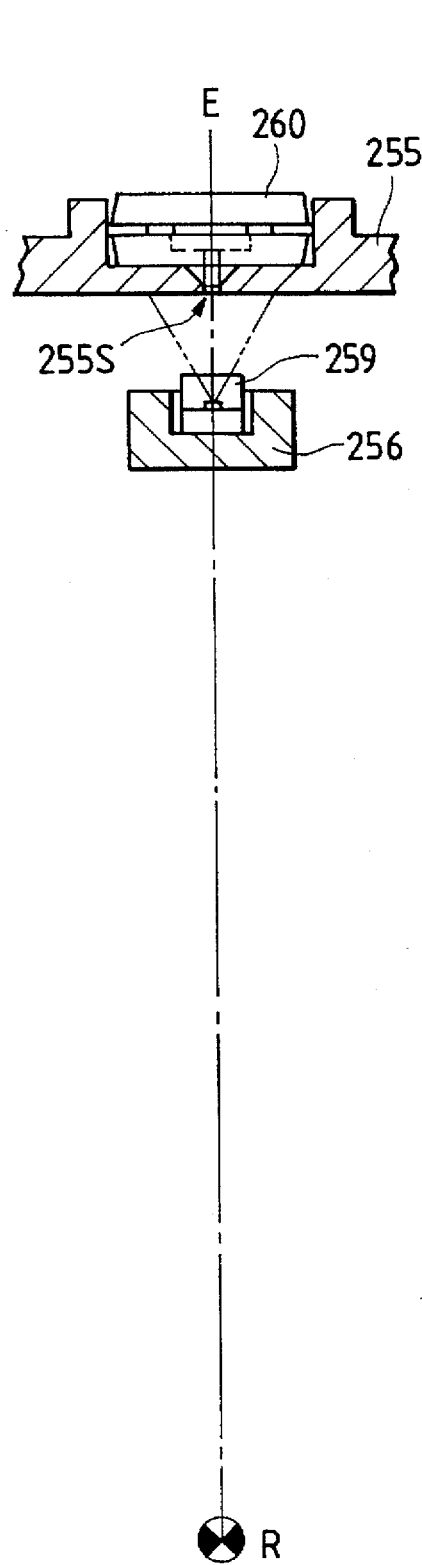
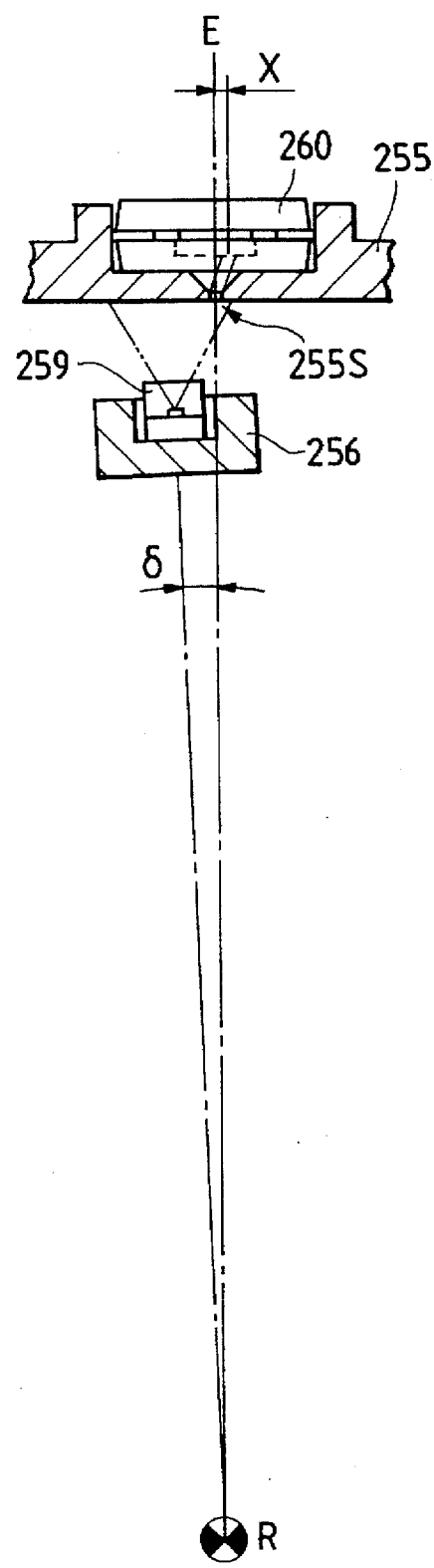

ANGULAR DEVIATION DETECTION APPARATUS

This application is a continuation of application Ser. No. 08/364,724 filed Dec. 27, 1994, now abandoned.

BACKGROUND OF THE INVENTION

1. Field of the Invention

The present invention relates to an angular deviation detection apparatus for detecting the angular deviation state of a member subjected to an angular deviation such as a variable surface of a variable apex angle prism.

2. Related Background Art

A conventional image blur correction apparatus using a variable apex angle prism has an arrangement shown in FIG. 19. A variable apex angle prism 101 is constituted by transparent plates 101-1P and 101-1Y consisting of, e.g., glass, support frames 101-2P and 101-2Y for supporting the transparent plates 101-1P and 101-2Y, reinforcement rings 101-3P and 101-3Y for reinforcing the support frames 101-2P and 101-2Y, a bellows film 101-4 for coupling the support frames 101-2P and 101-2Y, and a transparent liquid (not shown) with a high refractive index filled in a space formed by these members. A lens barrel in which the image blur correction apparatus using a variable apex angle prism is to be assembled has a portion 102 which includes lenses 103a, 103b, and 103c of lens groups of an optical system of the lens barrel. A support member 104 is fixed to the lens barrel. A blind hole 104aY and a through hole 104bY are coaxially formed in the support member to define an oscillation axis Y—Y for oscillating one surface of the variable apex angle prism 101 in the yawing direction. Although not shown, the support member 104 also has, in a direction perpendicular to the axis Y—Y, an oscillation axis P—P for oscillating the other surface of the variable apex angle prism 101 in the pitching direction. A holding frame 105Y holds the variable apex angle prism 101. The holding frame 105Y has a shaft-like projection which is fitted in the blind hole 104aY, and a pin 106Y fitted in the through hole 104bY is fitted under pressure in the holding frame 105Y. With this arrangement, the holding frame 105Y is supported to be able to oscillate about the oscillation axis Y—Y. The pin 106Y is biased by a leaf spring 107Y, and maintains the position of the holding frame 105Y with respect to the blind hole 104aY. A holding frame 105P holds the variable apex angle prism 101, and is supported to be able to oscillate about the oscillation axis P—P in the pitching direction in the same manner as the arrangement about the oscillation axis Y—Y. A transparent protection plate 108 protects the mechanism portion of the variable apex angle prism 101 from an external force, dust, and the like. The protection plate 108 is held by a holding frame 109.

The variable apex angle prism 101 has a variation in thickness caused by a manufacturing error, and a coaxial variation (shift) of the reinforcement rings 101-3P and 101-3Y. In order to absorb the coaxial shift, the reinforcement ring 101-3Y and the holding frame 105Y are fixed by fitting, and the reinforcement ring 101-3P and the holding frame 105P have a gap therebetween in the radial direction. Furthermore, in order to absorb the variation in thickness, the above-mentioned members have gaps in the thrust direction, and the two surfaces of the variable apex angle prism 101 are supported to be able to oscillate about the oscillation axes Y—Y and P—P by filling an adhesive in the gaps upon assembling.

However, in the above-mentioned prior art, since the two surfaces of the variable apex angle prism independently oscillate in the pitching and yawing directions, spaces for allowing the oscillations of the two surface are required. In addition, when the variable apex angle prism is arranged at the frontmost position of the optical system, a protection member is required, resulting in a large required space and high cost.

SUMMARY OF THE INVENTION

One aspect of the invention is to provide an angular deviation state detection apparatus which detects a deviation state of a movable portion which can deviate, and has a detection portion for detecting a predetermined angular deviation component of the movable portion without being influenced by a deviation component of the movable portion, which is different from the predetermined angular deviation component.

With this arrangement, the angular deviation state of the movable portion can be accurately detected.

BRIEF DESCRIPTION OF THE DRAWINGS

FIGS. 18A and 18B are views for explaining the mechanism of apex angle detection in the fourth embodiment of the present invention.

DETAILED DESCRIPTION OF THE PREFERRED EMBODIMENTS (First Embodiment)

Figure 1:
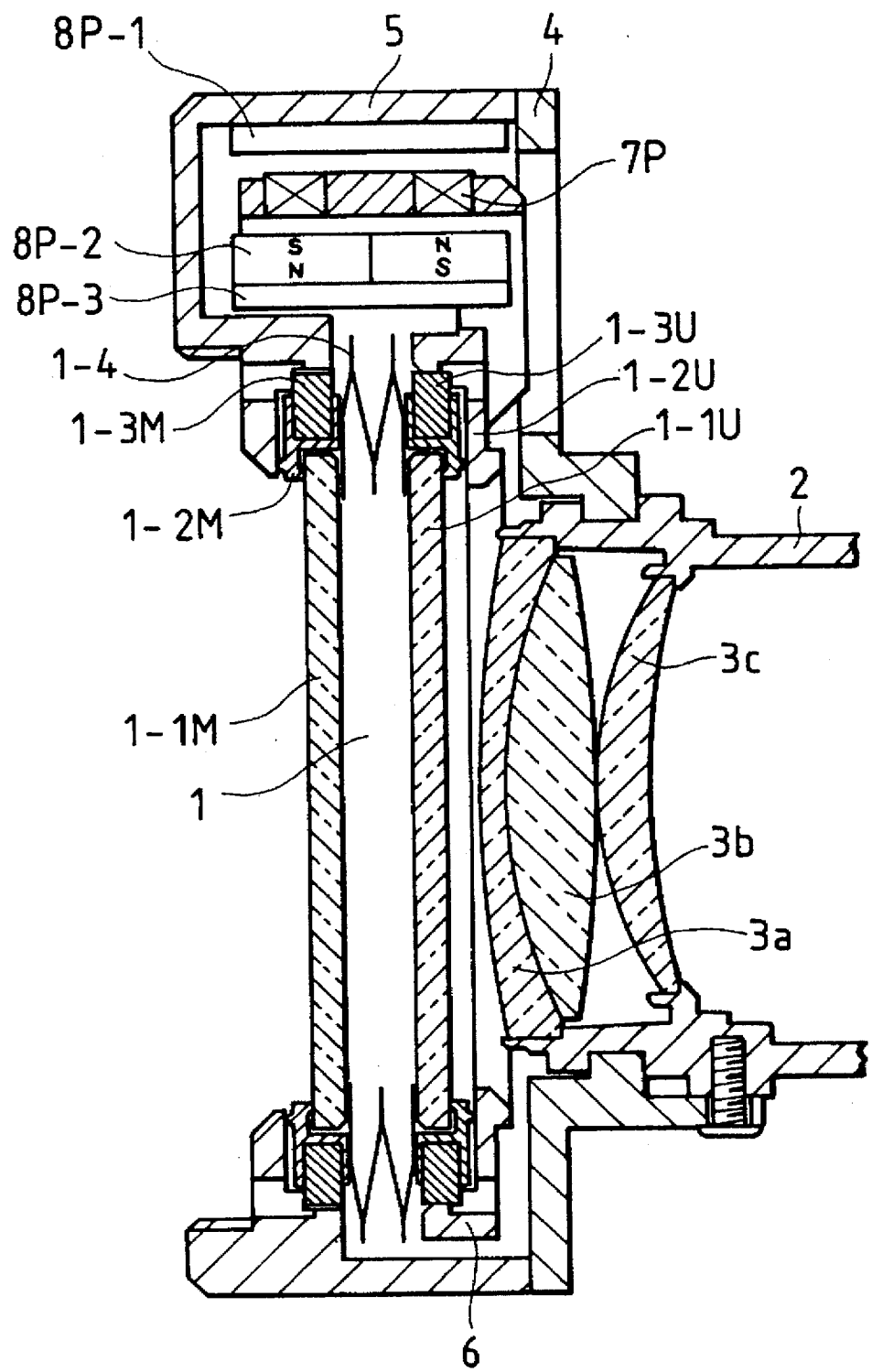
FIG. 1 is a sectional view showing a principal part of an image blur correction apparatus according to the first embodiment of the present invention.
Figure 2:
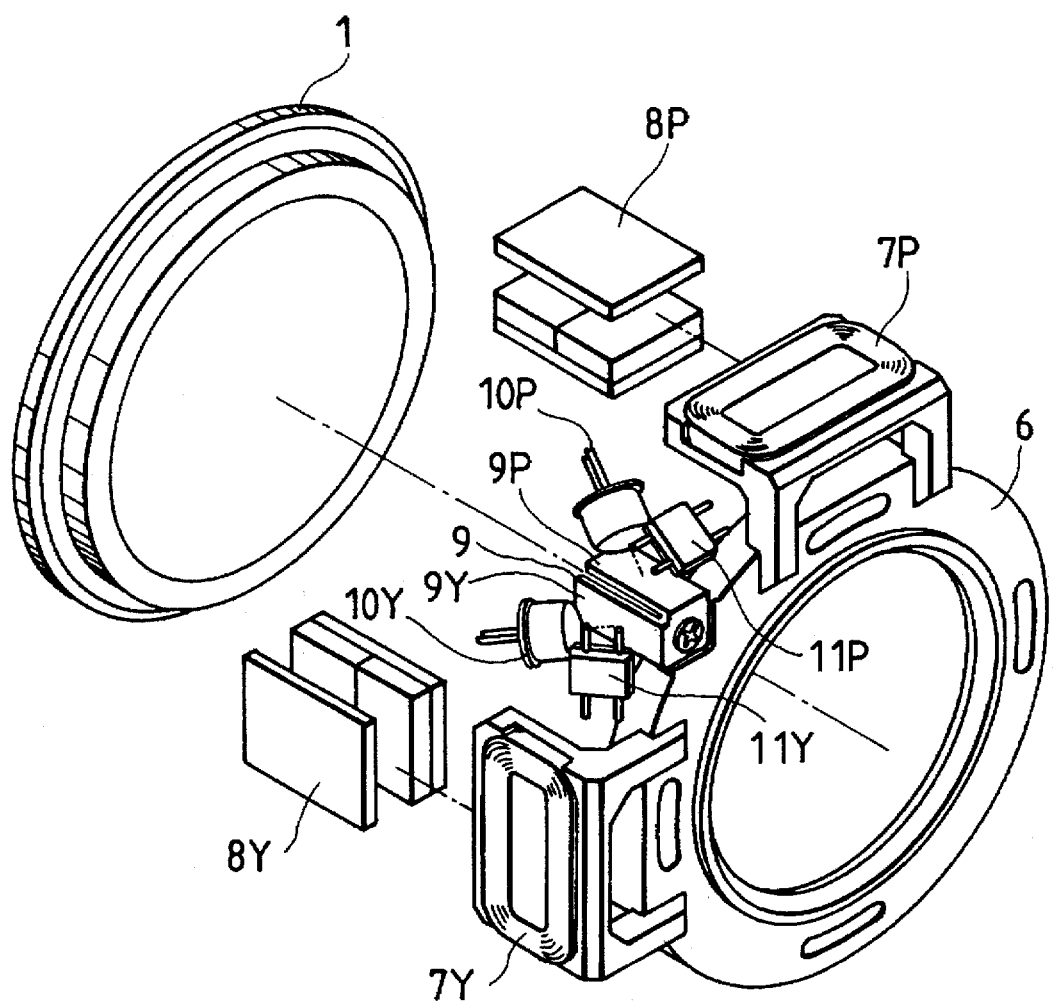
FIG. 2 is an exploded perspective view of a movable portion.

FIGS. 1 and 2 show the first embodiment of the present invention. FIG. 1 is a sectional view showing a principal part. A variable apex angle prism 1 is constituted by transparent plates 1-1U and 1-1M consisting of, e.g., glass, support frames 1-2U and 1-2M for supporting the transparent plates 1-1U and 1-2M, reinforcement rings 1-3U and 1-3M for reinforcing the support frames 1-2U and 1-2M, a bellows film 1-4 for coupling the support frames 1-2U and 1-2M, and a transparent liquid (not shown) with a high refractive index filled in a formed space. A lens barrel in which the image blur correction apparatus using a variable apex angle prism is to be assembled has a portion 2 which includes lenses 3a, 3b, and 3c of lens groups of an optical system of the lens barrel. A support member 4 is fixed to the lens barrel 2. A fixing frame 5 fixes one surface of the variable apex angle prism 1 to the support member 5, and a support frame 6 is fixed to the other surface of the variable apex angle prism 1. Coils 7P and 7Y (not shown in FIG. 1) are fixed by, e.g., an adhesive to the support frame 6 at positions where the extending directions from the optical axis to these coils are perpendicular to each other. An upper yoke 8P-1, a magnet 8P-2, and a lower yoke 8P-3 as a back yoke of the magnet 8P-2 are arranged on the two surfaces of the coil 7P to have a given gap therebetween so as to form a magnetic circuit, thus constituting an actuator 8P (the upper yoke and the magnet are held by a space member (not shown)). When the coil 7P is energized, a Lorentz force is generated to drive the support frame 6. An actuator 8Y (not shown in FIG. 1) with the same arrangement as above is arranged on the coil 7Y, and a synthesized force of the actuators 8P and 8Y acts on the support frame 6. Since the support frame 6 is coupled to a stationary portion via only the flexible bellows film 1-4, and the liquid sealed in the variable apex angle prism 1 has a constant volume, when the synthesized force acts on the support frame 6, the movable surface (supported by the support frame 6) of the variable apex angle prism 1 pivots about an almost center as an axis, thereby forming a prism apex angle.

FIG. 2 is an exploded perspective view of a movable portion, and the same reference numerals in FIG. 2 denote the same parts as in FIG. 1. A reflection plate 9 is fixed to the support frame 6 by screws, and has pitch and yaw reflection surfaces 9Y and 9P. The directions of the two reflection surfaces are perpendicular to each other. Furthermore, the two reflection surfaces are arranged to be parallel to the actuators 8P and 8Y.

An IRED element 10P with a lens is a light-emitting element for irradiating an infrared collimated light beam onto the reflection surface 9P at a given angle, and a PSD element 11P is an element for receiving the infrared collimated light beam reflected by the reflection surface 9P. The IRED element 10P with a lens and the PSD element 11P are held by a holder 12P (not shown in FIG. 2), which is fixed to the support member 4. The above combination of the elements constitute an apex angle sensor in the pitch direction. In the yaw direction as well, as shown in FIG. 2, an apex angle sensor in the yaw direction is arranged.

The apex angle sensor will be explained below with reference to FIGS. 3A, 3B, and 3C. The same reference numerals in FIGS. 3A to 3C denote the same parts as in FIG. 2, but suffices P and Y indicating the pitch and yaw directions are omitted.

Figure 3A:
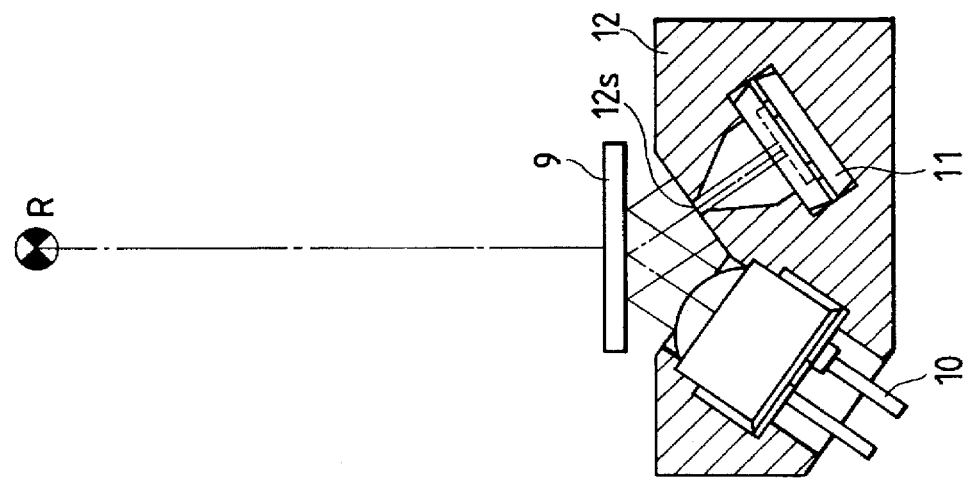
FIGS. 3A, 3B, and 3C are explanatory views of an apex angle sensor.
Figure 3B:
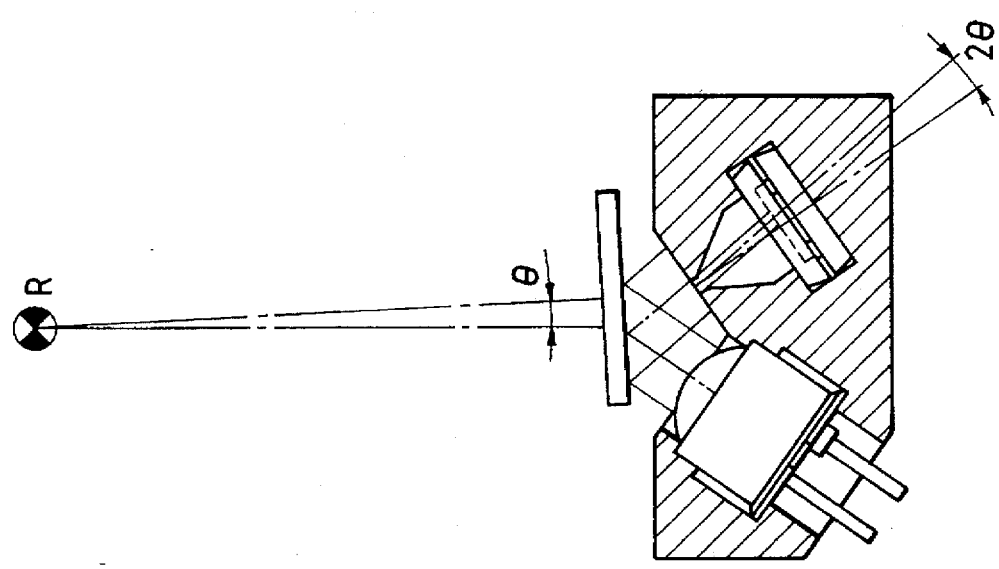
Figure 3C:
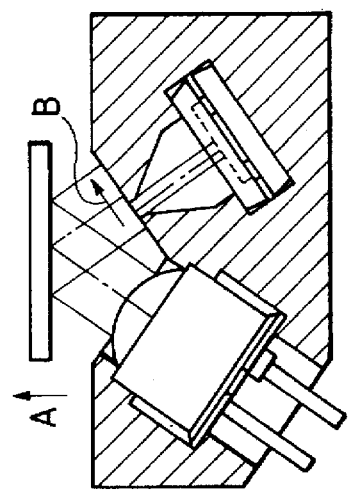

FIG. 3A shows a state when the oscillation angle is 0°. An infrared collimated light beam emitted from the IRED element 10 with a lens is reflected by the reflection plate 9, and a light beam passing through a slit opening portion 12s formed in the holder 12 is incident on the PSD element 11. FIG. 3B shows a state when the reflection plate 9 oscillates by θ about a given oscillation axis R. An infrared collimated light beam emitted from the IRED element 10 with a lens and reflected by the reflection plate 9 is tilted by 2θ since the reflection plate is tilted by θ as compared to the state shown in FIG. 3A. Therefore, based on a light beam passing through the slit opening portion 12s, an output corresponding to the distance from the slit portion to the PSD element 11 can be obtained from the PSD element 11. As is apparent from FIG. 3C, which explains a change in output upon translation of the reflection plate, even when the reflection plate 9 is translated in its plane, the output obtained from the PSD element does not change. FIG. 3C shows a state wherein the reflection plate 9 is translated in a direction perpendicular to its plane (arrow A). In this state, as can be seen from FIG. 3C, the collimated light beam reflected by the reflection plate 9 is translated in the direction of an arrow B, and the output obtained from the PSD element does not change. More specifically, as can be seen from FIGS. 3A to 3C, in this sensor arrangement, if the infrared collimated light beam emitted from the IRED element 10 with a lens has a sufficient diameter, the obtained output is proportional to only a change in angle of the reflection plate 9, and does not change in correspondence with a change in spatial position of the reflection plate 9.

Figure 4:
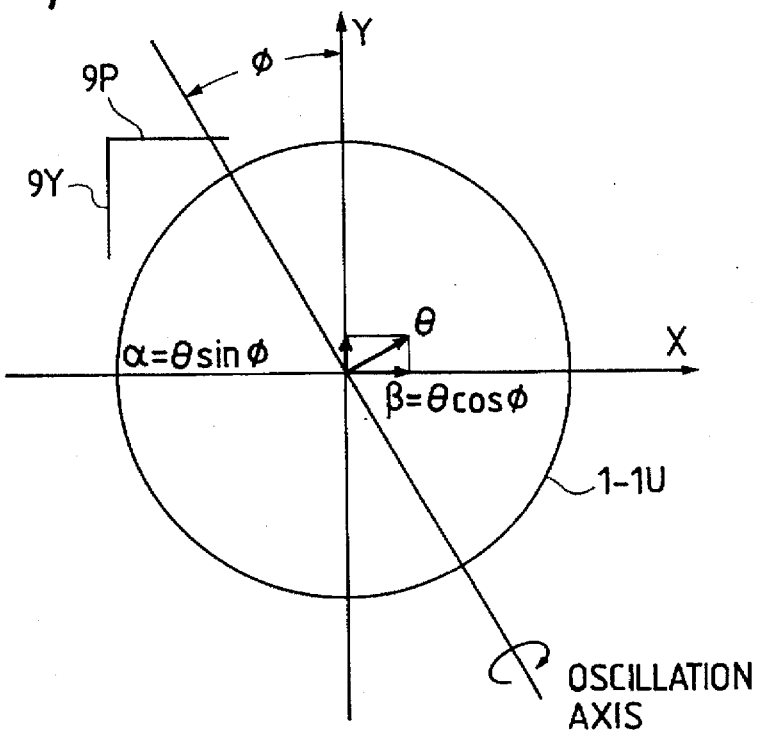
FIG. 4 is a view for explaining independence of the apex angle sensor.

The independence of the apex angle sensors in the pitch and yaw directions will be described below with reference to FIG. 4. The reflection plates 9P and 9Y are used for reflecting infrared collimated light beams in the pitch and yaw directions, as shown in FIG. 2, and the x- and y-axes respectively correspond to oscillation axes in the pitch and yaw directions. A circle in FIG. 4 represents a movable surface (glass surface) 1-1U of the variable apex angle prism. Assume a case wherein the movable surface 1-1U of the variable apex angle prism oscillates by θ about an axis tilted through an angle φ from the y-axis (yaw axis), as shown in FIG. 4. At this time, the tilt angles, in the pitch and yaw directions, of the movable surface are respectively given by:

$$\alpha = \theta\sin\phi, \quad \beta = \theta\cos\phi$$

If the angles α and β can be detected by the apex angle sensors, the independence of the apex angle sensors in the pitch and yaw directions can be perfectly maintained. Since the sensor outputs are proportional to the tilt angles of the reflection surfaces 9P and 9Y, as described above, the tilt angles of the reflection surfaces 9P and 9Y are calculated. When the tilt angles of the reflection surfaces are respectively represented by $\alpha_r$ and $\beta_r$, and formulas are arranged by setting θ≪1 to ignore small higher-degree terms equal to or higher than 4th degree, we have:

$$\tan\alpha_r = \tan\alpha - \tfrac{1}{6}\theta^3 \cdot \sin\phi\cos^2\phi$$

$$\tan\beta_r = \tan\beta - \tfrac{1}{6}\theta^3 \cdot \cos\phi\sin^2\phi$$

The second term of the right-hand side is the 3rd-degree term of θ. For example, when θ=3 deg, the second term is about 1/1,000 of the first term even in the worst case. Therefore, this amount does not pose any practical problem for the pitch and yaw apex angle sensors although a crosstalk component is generated.

Figure 5:
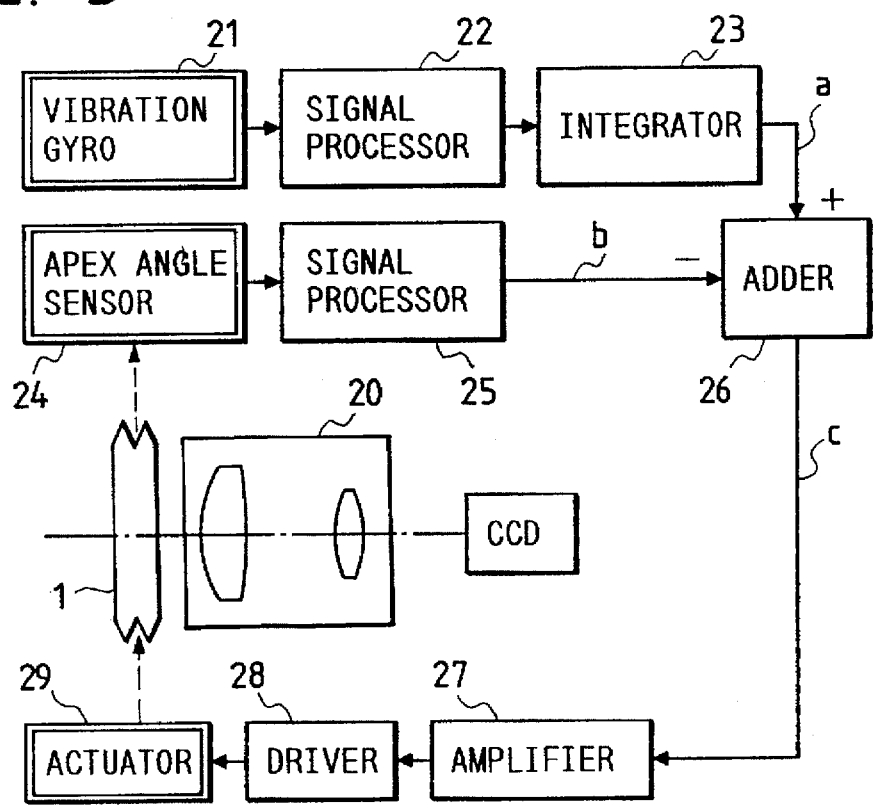
FIG. 5 is a block diagram of the image blur correction apparatus.

FIG. 5 is a block diagram of an image blur correction apparatus using a variable apex angle prism. The variable apex angle prism 1 is arranged in the frontmost portion of a photographing optical system 20. A vibration gyro 21 as an angular velocity sensor is fixed to a stationary member of the apparatus, and outputs the angular velocity of the apparatus as a signal. The angular velocity signal is subjected to processing such as BPF in a signal processor 22, and the processed signal is integrated by an integrator 23 to be converted into an angle signal a of the apparatus. The above-mentioned apex angle sensor 24 outputs a signal proportional to the apex angle of the variable apex angle prism 1. This signal is subjected to processing such as amplification, filter processing, and the like in a signal processor 25 to be converted into an apex angle signal b. An adder 26 adds the apex angle signal b and the angle signal a of the apparatus in opposite polarities to obtain a signal c, and the signal c is amplified by an amplifier 27. The amplified signal is converted into a driving signal by a driver 28, and the driving signal drives an actuator 29, thus changing the prism apex angle of the variable apex angle prism.

In this block arrangement, the blocks 24 to 29 constitute a feedback circuit including the variable apex angle prism 1, so that the signal c becomes zero, i.e., the angle signal a of the apparatus becomes equal to the apex angle signal b of the variable apex angle prism 1. Since the variable apex angle prism 1 is driven in a direction to cancel the movement of the apparatus, an image blur can be corrected without changing the state of a light beam incident on the photographing optical system. FIG. 5 shows the arrangement for only one axis (pitch or yaw direction). As described above, since the independence of the apex angle sensors in the pitch and yaw directions is practically maintained, when the coaxial arrangements are provided in correspondence with the pitch and yaw directions and are independently controlled, image blur correction in the pitch and yaw directions can be realized by driving only one surface of the variable apex angle prism.

This embodiment described above can provide the following unique effects.

1. Since the support mechanism for the movable surface of the variable apex angle prism has no slidable bearing portion such as a combination of a pin and hole, no extra load due to friction is imposed.

2. Since the apex angle sensor output depends only on the angle of the movable surface of the variable apex angle prism and does not force an unnatural deformation of the bellows film portion of the variable apex angle prism in feedback control of a target angle signal (the movable surface oscillates about an axis to oscillate), a driving operation can be attained by a minimum driving force.

3. Since the apex angle sensor output has sensitivity to only the angle, even when the variable apex angle prism element suffers manufacturing variations (a variation in thickness, a coaxial variation of two surfaces, a curl of the bellows film, and the like), these variations do not influence the performance of the image blur correction function.

4. Since the support mechanism for the movable surface of the variable apex angle prism has no slidable bearing portion such as a combination of a pin and hole, and the output from the apex angle sensor has sensitivity to only the angle, performance of the image blur correction function is stable against an environmental change. For example, even when the thickness of the variable apex angle prism changes due to a high or low temperature, high or low pressure, or the like, since no bearing portion is arranged, no increase in load due to an increase in side pressure of the bearing portion occurs. Also, there is no fear of running out of an oil in the bearing portion due to aging, entrance of dust, and the like. Even when the bellows film causes a creep phenomenon in a high-humidity environment, and the position of the movable surface is slightly shifted, such a shift does not change the apex angle sensor output.

5. Since the apex angle sensor has a reflection type arrangement, the angle of the movable surface (the angle of the reflection surface) of the variable apex angle prism can be detected at a doubled sensitivity. For this reason, when the sensitivity remains the same, the distance between the slit portion and the PSD element can be halved, thus improving the space factor. Since an electrical element need not be arranged at the movable portion side, no increase in load due to wires occurs.

In the above-mentioned embodiment, the reflection surfaces of the pitch and yaw apex angle sensors are arranged in directions perpendicular to the movable surface 1-1U of the variable apex angle prism 1. However, in this sensor arrangement, since each sensor output has sensitivity to only the angle, the positions of the sensors are not limited to the above-mentioned positions. For example, the sensors may be arranged above the movable surface 1-1U of the variable apex angle prism 1 to be parallel to the movable surface.

As described above, according to the above-mentioned embodiment, even when the angle of a movable optical member changes together with translation, only the change in angle can be accurately detected. In addition, the degree of freedom of the support method of the movable member can be improved.

(Second Embodiment)

Figure 6:
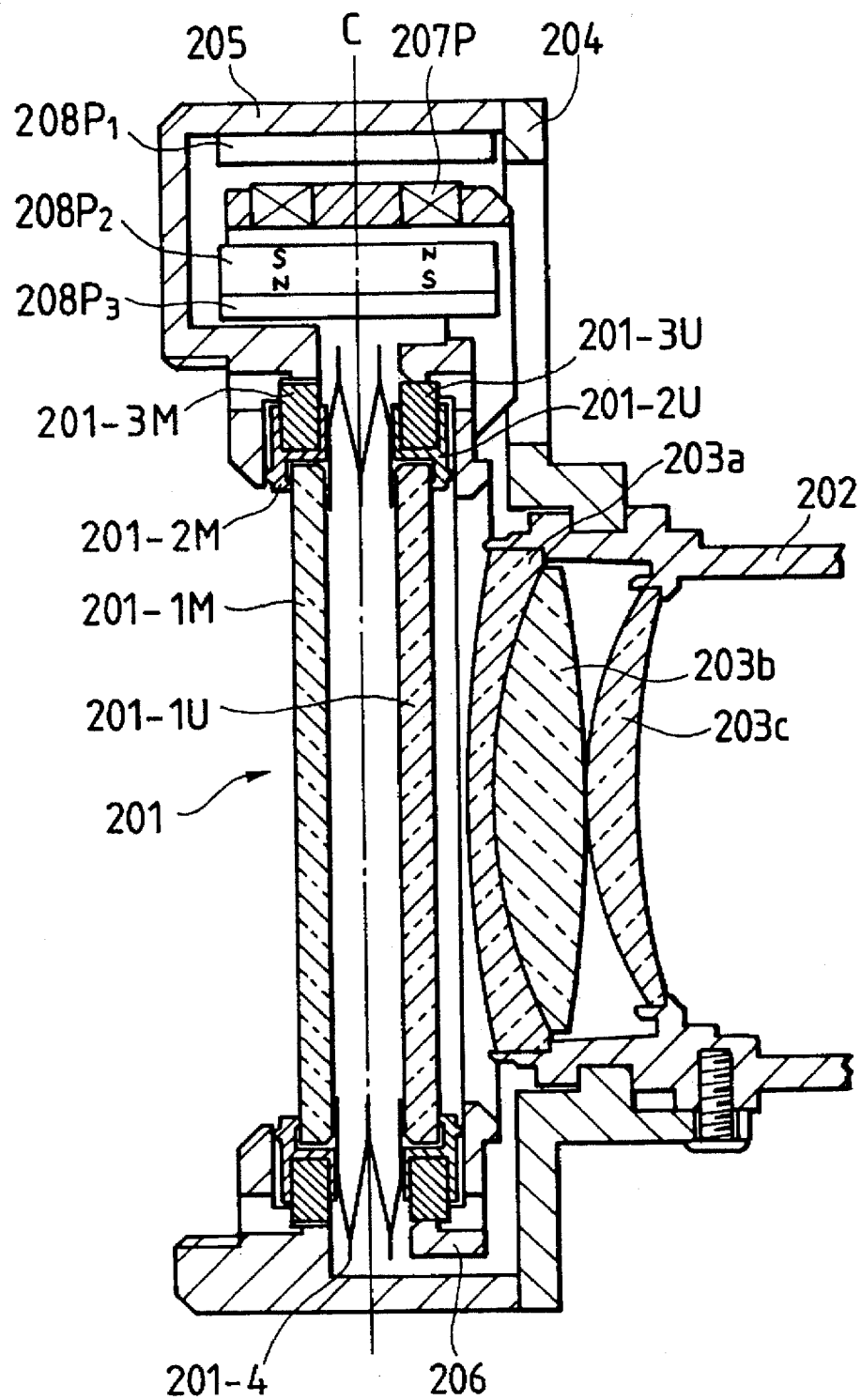
FIG. 6 is a sectional view showing a principal part of an image blur correction apparatus according to the second embodiment of the present invention.

FIG. 6 is a sectional view showing a principal part of an image blur correction apparatus according to the second embodiment of the present invention. Referring to FIG. 6, a variable apex angle prism 201 is constituted by transparent plates 201-1U and 201-1M consisting of, e.g., glass, support frames 201-2U and 201-2M for supporting the transparent plates 201-1U and 201-1M, reinforcement rings 201-3U and 201-3M for reinforcing the support frames 201-2U and 201-2M, a bellows film 201-4 for coupling the support frames 201-2U and 201-2M, and a transparent liquid (not shown) with a high refractive index, which is filled in a formed space.

A lens barrel in which the image blur correction apparatus using a variable apex angle prism is to be assembled has a portion 202 which includes lenses 203a, 203b, and 203c of lens groups of an optical system of the lens barrel. A support member 204 is fixed to the lens barrel 202. A fixing frame 205 fixes one surface of the variable apex angle prism 201 to the support member 204, and a support frame 206 is fixed to the other surface of the variable apex angle prism 201.

Coils 207P and 207Y (not shown in FIG. 6, but shown in FIG. 8 to be described later) are fixed by, e.g., an adhesive to the support frame 206 to form a right angle therebetween. An upper yoke $208P_1$, a magnet $208P_2$, and a lower yoke $208P_3$ as a back yoke of the magnet $208P_2$ are arranged on the two surfaces of the coil 207P to have a given gap therebetween so as to form a magnetic circuit, thus constituting an actuator 208P (the upper yoke and the magnet are held by a space member (not shown)). When the coil 207P is energized, a Lorentz force is generated to drive the support frame 206. An actuator 208Y (not shown in FIG. 6, but shown in FIG. 8 to be described later) with the same arrangement as above is arranged on the coil 207Y, and a synthesized force of the actuators 208P and 208Y acts on the support frame 206.

Figure 7:
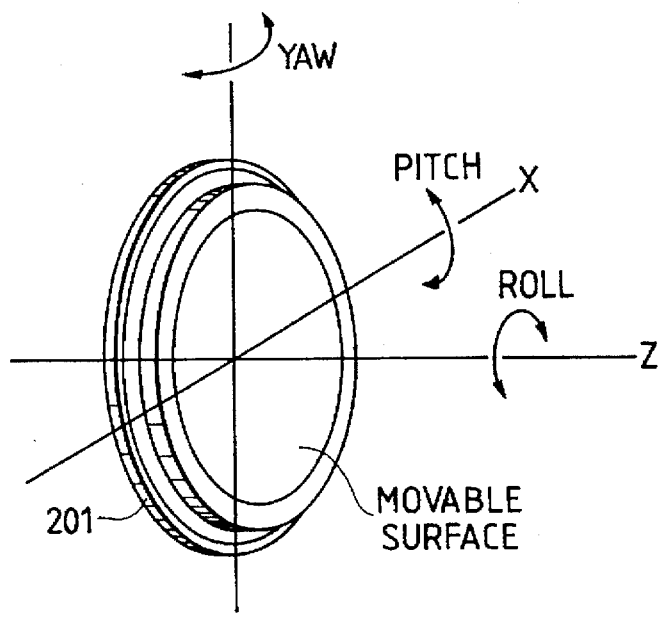
FIG. 7 is a perspective view showing the movable direction of a variable apex angle prism shown in FIG. 6.

A deformation of the variable apex angle prism 201 by this synthesized force will be described below with reference to FIG. 7.

When one surface of the variable apex angle prism 201 is fixed, and the other surface is arranged to be movable, if axes perpendicular to the central plane of the variable apex angle prism 201 are represented by X and Y, and an axis perpendicular to the axes X and Y is represented by Z, a total of six degrees of freedom of the movement of a movable surface 201-1U, i.e., movements in the respective axial directions and rotations about the axes, are available.

Note that the movable surface is coupled to the stationary surface via the bellows film having a high extendability in the Z-axis direction, and a liquid is filled in the prism. Therefore, the movements, in the X- and Y-axis directions, of the movable surface are regulated by the bellows film, and the movement, in the Z-axis direction, of the movable surface is regulated by the incompressibility of the sealed liquid and the tension of the bellows film. Also, the degree of freedom (roll) of the rotation about the Z-axis is regulated by the bellows film. Consequently, the degrees of freedom which allow easy deformation of the movable surface with respect to the stationary surface are limited to two degrees of freedom, i.e., the rotation (pitch) about the X-axis and the rotation (yaw) about the Y-axis. In addition, the axis of rotation is located on the central plane of the variable apex angle prism 201 if the variable apex angle prism has a symmetrical shape. More specifically, when the synthesized force of the actuators 208P and 208Y in FIG. 6 acts on the support frame 206, the movable surface 201 pivots in the direction of the synthesized force with respect to the stationary surface of the variable apex angle prism 201, thus forming a prism apex angle.

Figure 8:
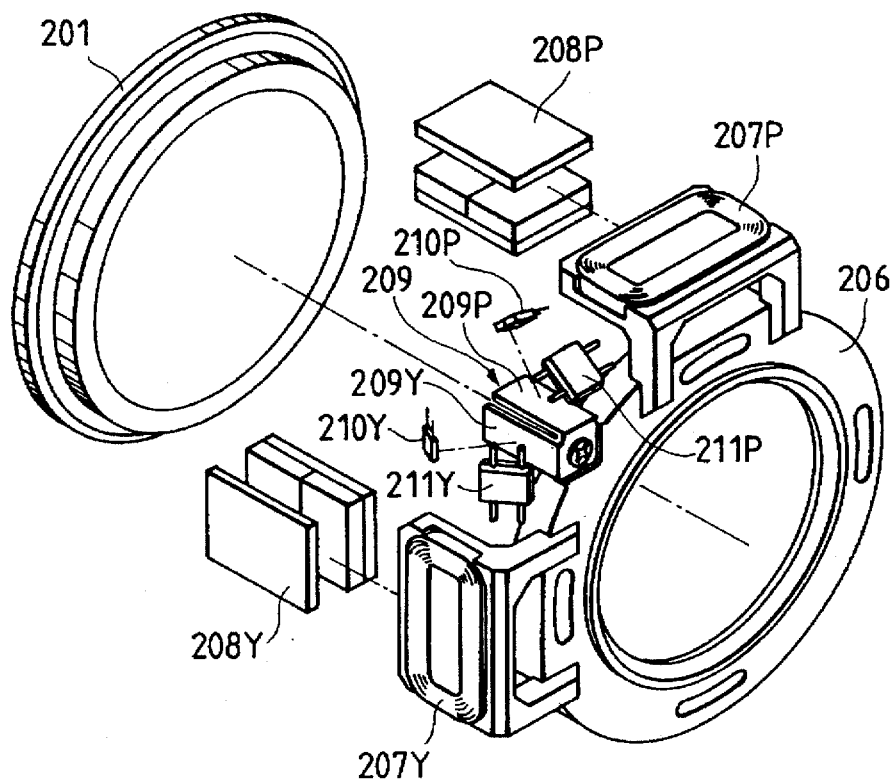
FIG. 8 is a perspective view showing the variable apex angle prism, its driving means, and the like in FIG. 6.

FIG. 8 is an exploded perspective view of a movable portion, and the same reference numerals in FIG. 8 denote the same parts as in FIG. 6.

Referring to FIG. 8, a reflection plate 209 is fixed to the support frame 206 by screws, and has pitch and yaw reflection surfaces 209Y and 209P. The two reflection surfaces define a right angle therebetween, and are also perpendicular to the central plane of the two surfaces of the variable apex angle prism 201 in an initial state. Furthermore, the two reflection surfaces are arranged to be parallel to the actuators 208P and 208Y, respectively. An iRED 210P is a light-emitting element for irradiating infrared light onto the pitch reflection surface 209P at a given angle, and a PSD 211P is an element for receiving infrared light reflected by the pitch reflection surface 209P.

The iRED 210P and the PSD 211P are held by a holder 212P (not shown in FIG. 8; to be described later with reference to FIG. 9), and the holder 212P is fixed to the support frame 204 shown in FIG. 6. The above-mentioned combination constitutes an apex angle sensor in the pitching direction (to be simply referred to as a pitch direction hereinafter). In the yawing direction (to be simply referred to as a yaw direction hereinafter), an apex angle sensor in the yaw direction is arranged, as shown in FIG. 8.

The apex angle sensor will be described below with reference to FIGS. 9A, 9B, and 9C. The same reference numerals in FIGS. 9A to 9C denote the same parts as in FIG. 8, but suffixes P and Y indicating the pitch and yaw directions are omitted.

Figure 9A:
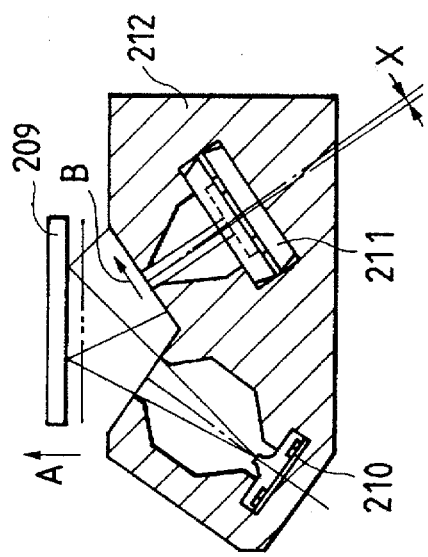
FIGS. 9A, 9B and 9C are sectional views showing the structure of an apex angle sensor shown in FIG. 8.

FIG. 9A shows the state of an oscillation angle=0°. In this state, infrared light emitted from the iRED 210 is reflected by the reflection plate 209, and is incident on the PSD 211 via a slit opening portion 212s formed in the holder 212. A plane indicated by an alternate long and short dashed line C is a plane including an oscillation axis R and perpendicular to the optical axis. The positional relationship between the iRED 210 and the reflection plate 209 is determined so that the center of the light beam is located at a crossing point among the iRED 210, the reflection plate 209, and the alternate long and short dashed line C.

Figure 9B:
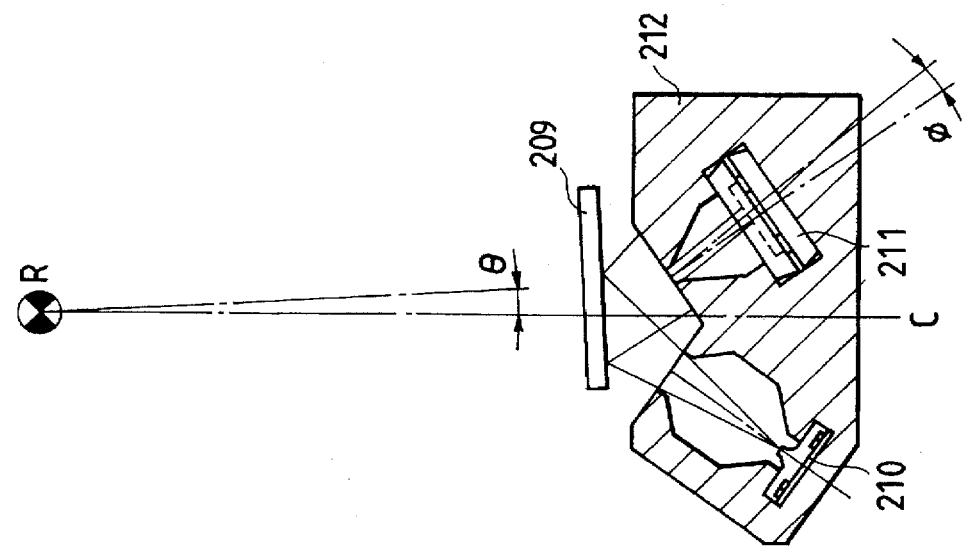

FIG. 9B shows a state wherein the reflection plate 209 oscillates through an angle θ about the oscillation axis R (present in the central plane of the variable apex angle prism 201). In this case, infrared light emitted from the iRED 210 and reflected by the reflection plate 209 is tilted by an angle φ since the reflection plate 209 is tilted by an angle θ as compared to the state shown in FIG. 9A. Therefore, based on a light beam passing through the slit opening portion 212s, an output corresponding to the distance from the slit opening portion 212s to the PSD 211 can be obtained from the PSD 211.

A change in output due to translation of the reflection surface will be explained below.

As can be seen from FIG. 9A, even when the reflection plate 209 is translated in its in-plane direction, the output obtained from the PSD 211 does not change.

Figure 9C:
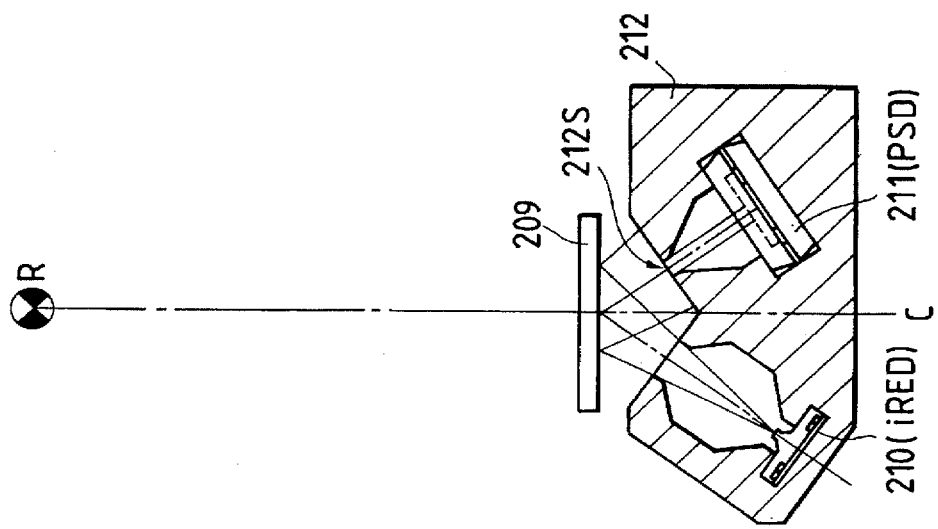

FIG. 9C shows a state wherein the reflection plate 209 is translated in a direction perpendicular to its surface (in the direction of an arrow A).

At this time, since the infrared light beam reflected by the reflection plate 209 moves in the direction of an arrow B as a whole and diverges, an output corresponding to a light beam movement indicated by X on the PSD 211 is generated. However, in this embodiment, the apex angle sensor unit is arranged in the vicinity of the central plane of the variable apex angle prism, and the movement of the reflection surface 209 in the direction of the arrow A in FIG. 9C is designed to be a practically negligible amount, an apex angle sensor output corresponding to a change in apex angle of the variable apex angle prism 201 can be obtained.

The independence of the apex angle sensors in the pitch and yaw directions will be explained below with reference to FIG. 10.

The reflection plates 209P and 209Y are used for reflecting infrared light beams in the pitch and yaw directions, as has been described above with reference to FIG. 8, and the X- and Y-axes respectively correspond to oscillation axes in the pitch and yaw directions. A circle represents the movable surface of the variable apex angle prism 201.

Figure 10:
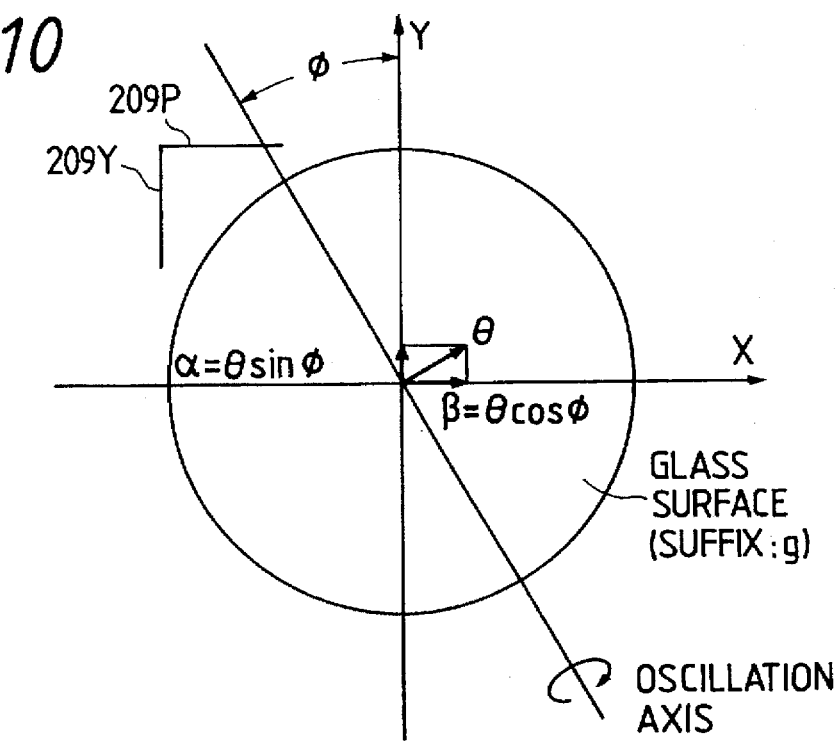
FIG. 10 is a view for explaining apex angle variation of the variable apex angle prism in the second embodiment of the present invention.

Assume a case wherein the movable surface of the variable apex angle prism 201 oscillates by θ about an axis tilted through an angle φ from the Y-axis, as shown in FIG. 10. At this time, the tilt angles, in the pitch and yaw directions, of the movable surface are respectively given by:

$$\alpha = \theta \sin\phi$$

$$\beta = \theta \cos\phi$$

If the angles α and β can be detected by the apex angle sensors, the independence of the apex angle sensors in the pitch and yaw directions can be perfectly maintained. Since the sensor outputs are proportional to the tilt angles of the reflection surfaces 209P and 209Y, as described above, the tilt angles of the reflection surfaces 209P and 209Y are calculated. When the tilt angles of the reflection surfaces are respectively represented by $\alpha_r$ and $\beta_r$, and formulas are arranged by setting θ<<1 to ignore small higher-degree terms equal to or higher than 4th degree, we have:

$\tan\alpha_r = \tan\alpha - (1/6)\theta^3 \sin\phi \cos^2\phi$ $\tan\beta_r = \tan\beta - (1/6)\theta^3 \cos\phi \sin^2\phi$ The second term of the right-hand side is the 3rd-degree term of θ. For example, when "θ=3 deg", the second term is about 1/1,000 of the first term even in the worst case. Therefore, this amount does not pose any practical problem for the pitch and yaw apex angle sensors although a crosstalk component is generated.

Figure 11:
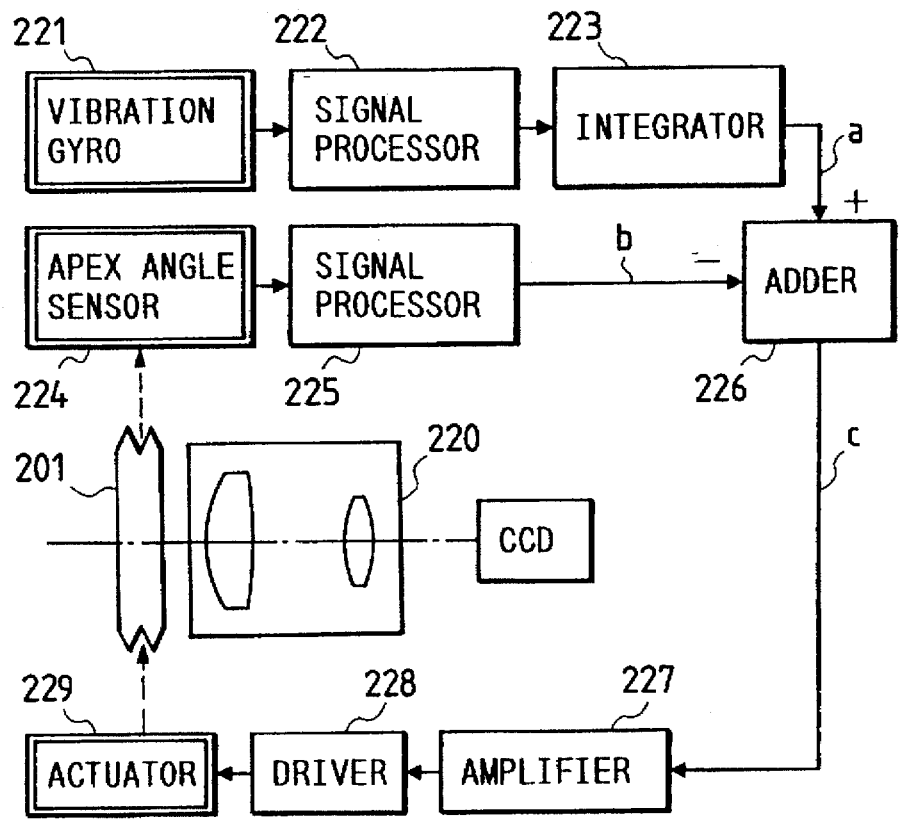
FIG. 11 is a block diagram showing the circuit arrangement of an image blur correction apparatus according to the second embodiment of the present invention.

FIG. 11 is a block diagram of an image blur correction apparatus using the variable apex angle prism 201.

Referring to FIG. 11, the variable apex angle prism 201 is arranged in the frontmost portion of a photographing optical system 220. A vibration gyro 221 as an angular velocity sensor is fixed to a stationary member of the apparatus, and outputs the angular velocity of the apparatus as a signal. The angular velocity signal is subjected to processing such as BPF in a signal processor 222, the processed signal is integrated by an integrator 223, and the integrated signal is output as an angle signal a of the apparatus. The above-mentioned apex angle sensor 224 outputs a signal proportional to the apex angle of the variable apex angle prism 201. This signal is subjected to processing such as amplification, filter processing, and the like in a signal processor 225, and is output as an apex angle signal b. An adder 226 adds the apex angle signal b and the angle signal a of the apparatus in opposite polarities to obtain a signal c, and the signal c is amplified by an amplifier 227. The amplified signal is converted into a driving signal by a driver 228, and the driving signal drives an actuator 229, thus changing the prism apex angle of the variable apex angle prism 201.

In this circuit arrangement, members from the apex angle sensor 224 to the actuator 229 constitute a feedback circuit including the variable apex angle prism 201, so that the signal c becomes zero, i.e., the angle signal a of the apparatus becomes equal to the apex angle signal b of the variable apex angle prism 201. Since the variable apex angle prism 201 is driven in a direction to cancel the movement of the apparatus, an image blur can be corrected without changing the state of a light beam incident on the photographing optical system 220.

FIG. 11 shows the arrangement for only one axis (pitch or yaw direction). As described above, since the independence of the apex angle sensors in the pitch and yaw directions is practically maintained, when the coaxial arrangements are provided in correspondence with the pitch and yaw directions and are independently controlled, image blur correction in the pitch and yaw directions can be realized by driving only one surface of the variable apex angle prism 201.

The above-mentioned embodiment can provide the following unique effects.

1) Since the support mechanism for the movable surface of the variable apex angle prism 201 has no slidable bearing portion such as a combination of a pin and hole, no extra load due to friction is imposed.

2) Since the output from the apex angle sensor 224 responds to only on the angle of the movable surface of the variable apex angle prism 201 and does not force an unnatural deformation of the bellows film portion of the variable apex angle prism 201 in feedback control of a target angle signal (the movable surface oscillates about an axis to oscillate), a driving operation can be attained by a minimum driving force.

3) Since the output from the apex angle sensor 224 has sensitivity to only a change in angle, even when the variable apex angle prism 201 suffers manufacturing variations (a variation in thickness, a coaxial variation of two surfaces, a curl of the bellows film, and the like), these variations do not adversely influence the performance of the image blur correction mechanism (i.e., the slope of the output from the apex angle sensor 224 does not change).

4) Since the support mechanism for the movable surface of the variable apex angle prism 201 has no slidable bearing portion such as a combination of a pin and hole, and the output from the apex angle sensor has sensitivity to only a change in angle, performance of the image blur correction function is stable against an environmental change. For example, even when the thickness of the variable apex angle prism 201 changes due to a high or low temperature, high or low pressure, or the like, since no bearing portion is arranged, no increase in load due to an increase in side pressure of the bearing portion occurs. Also, there is no fear of running out of an oil in the bearing portion due to aging, entrance of dust, and the like. Even when the bellows film causes a creep phenomenon in a high-humidity environment, and the position of the movable surface is slightly shifted, such a shift does not change the slope of the apex angle sensor output.

5) Since the apex angle sensor 224 has a reflection type arrangement, the sensitivity to a change in angle of the movable surface of the variable apex angle prism 201 can be increased, and the distance between the slit opening portion 212s and the PSD 211 can be shortened, thus improving the space factor. Since an electrical element need not be arranged at the movable portion side, no increase in load due to wires occurs.

(Third Embodiment)

Figure 12:
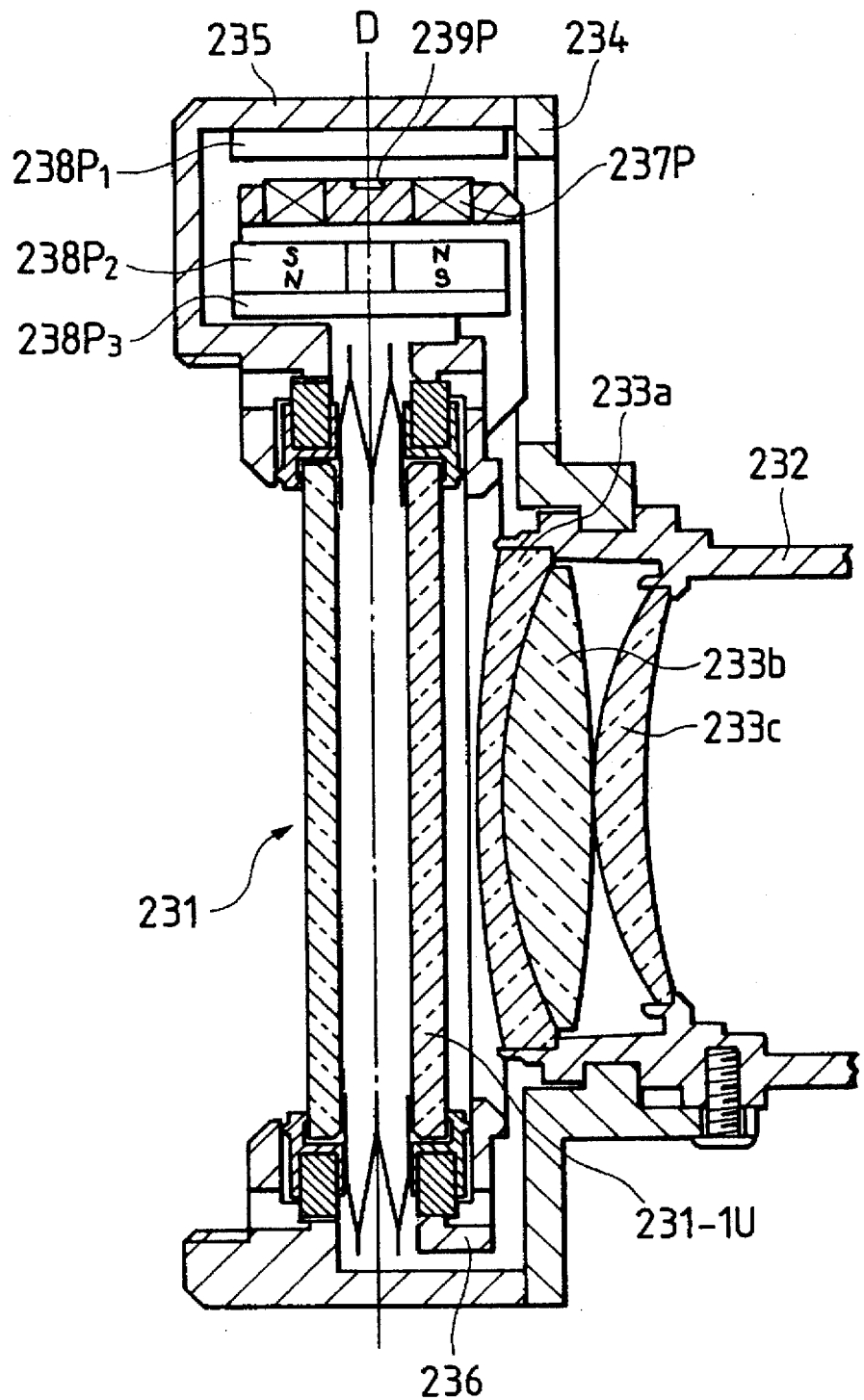
FIG. 12 is a sectional view showing a principal part of an image blur correction apparatus according to the third embodiment of the present invention.
Figure 13:
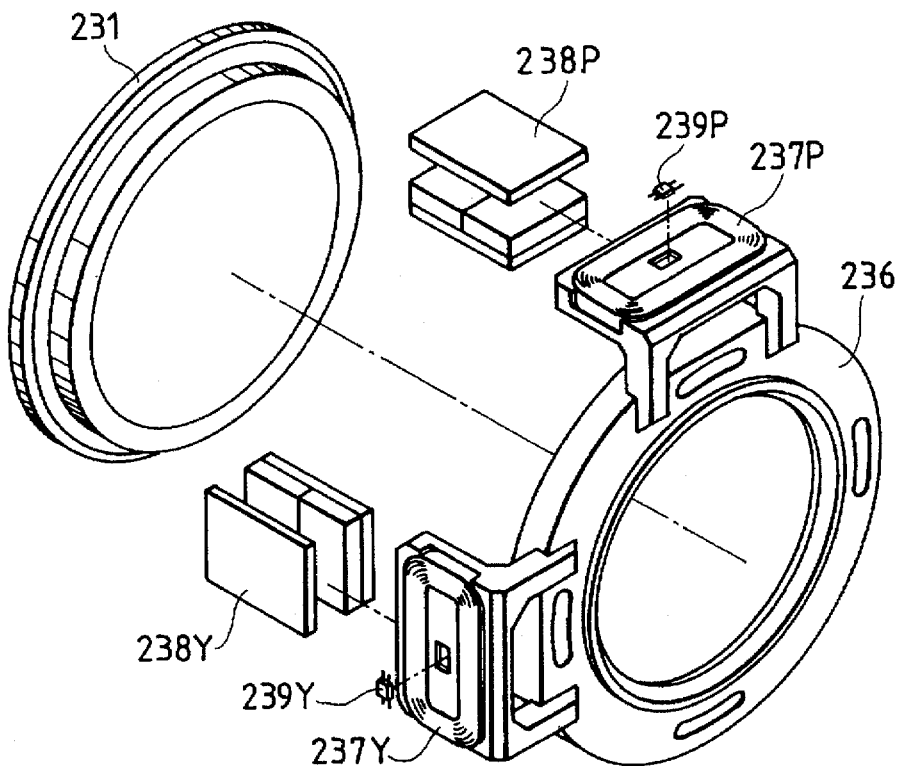
FIG. 13 is an exploded perspective view of a movable portion shown in FIG. 12.

FIGS. 12 and 13 show the third embodiment in which the present invention is applied to an image blur correction apparatus of an optical equipment such as a video camera, and FIG. 12 is a sectional view of principal part of the third embodiment.

Referring to FIG. 12, a lens barrel in which the image blur correction apparatus using a variable apex angle prism 231 is to be assembled has a portion 232 which includes lenses 233a, 233b, and 233c of lens groups of an optical system of the lens barrel. A support member 234 is fixed to the lens barrel 232. A fixing frame 235 fixes one surface of the variable apex angle prism 231 to the support member 235, and a support frame 236 is fixed to the other movable surface 231-1U of the variable apex angle prism 231.

Coils 237P and 237Y (not shown in FIG. 12) are fixed by, e.g., an adhesive to the support frame 236 to form a right angle therebetween. An upper yoke $238P_1$, a magnet $238P_2$, and a lower yoke $238P_3$ as a back yoke of the magnet $238P_2$ are arranged on the two surfaces of the coil 237P to have a given gap therebetween so as to form a magnetic circuit, thus constituting an actuator 238P (the upper yoke and the magnet are held by a space member (not shown)). When the coil 237P is energized, a Lorentz force is generated to drive the support frame 236. An actuator 238Y (not shown in FIG. 13) with the same arrangement as above is arranged on the coil 237Y, and a synthesized force of the actuators 238P and 238Y acts on the support frame 236.

Hall elements 239P and 239Y (not shown in FIG. 12) detect the strengths of magnetic fields generated by the magnets $238P_2$ and $238Y_2$. The Hall elements 239P and 239Y are fixed by, e.g., an adhesive at positions of the central portions of the coils 237P and 237Y in the vicinity of a plane (indicated by an alternate long and short dashed line D) including the oscillation axis of the movable surface of the variable apex angle prism 231 and perpendicular to the optical axis, so as to form an angle of 90° therebetween. This arrangement constitutes apex angle detection means.

FIG. 13 is an exploded perspective view of a movable portion, and the same reference numerals in FIG. 13 denote the same parts as in FIG. 12.

The independence of the two apex angle detection means will be explained below with reference to FIG. 14.

Figure 14:
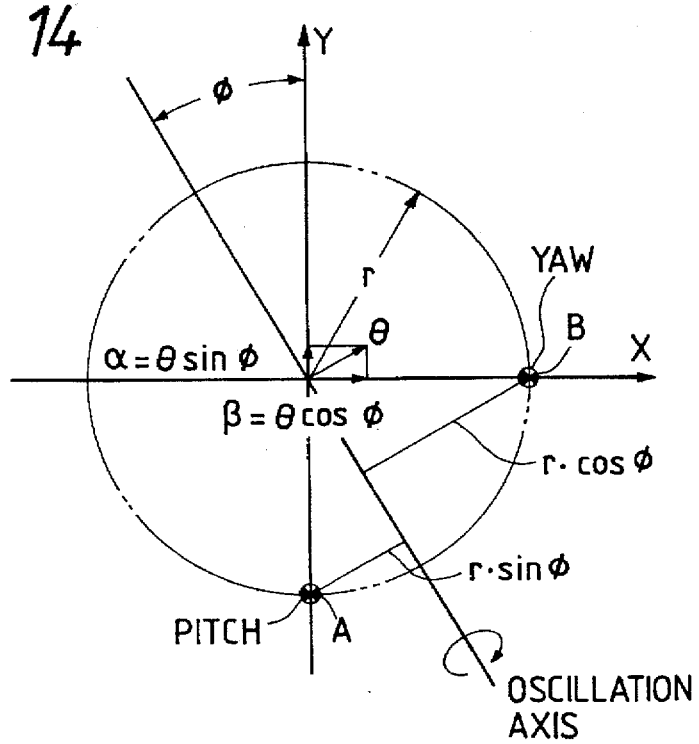
FIG. 14 is a view for explaining independence of two apex angle detection means in the third embodiment of the present invention.

Referring to FIG. 14, the X- and Y-axes are axes in a plane which includes the oscillation axis of the movable surface of the variable apex angle prism 231 and is perpendicular to the optical axis. The apex angles in the pitch and yaw directions are proportional to the moving amounts of points A and B separated by a distance r from the center in the direction of the plane of the drawing of FIG. 14. Since the X- and Y-axes are present in the plane where the axis of rotation of the variable apex angle prism 231 exists, when a rotation about the X- or Y-axis occurs, a point on the rotating axis does not move in the direction of the plane of the drawing of FIG. 14. As can be seen from this fact, only one apex angle output changes in this case.

Assume that the movable surface is rotated by an angle $\theta$ about an axis tilted by $\phi$ from the Y-axis.

At this time, apex angles $\alpha$ and $\beta$ in the pitch and yaw directions are respectively given by:

$$\alpha = \theta \cdot \sin\phi$$

$$\beta = \theta \cdot \cos\phi$$

The moving amounts, in the direction of the plane of the drawing of FIG. 14, of the points A and B in the pitch and yaw directions are respectively given by:

$$r \cdot \sin\phi \cdot \sin\theta$$

$$r \cdot \cos\phi \cdot \sin\theta$$

Assuming that $\theta$ satisfies "$\theta \ll 1$", since $\theta \equiv \sin\theta$, we have:

$$r \cdot \sin\phi \cdot \sin\theta = r \cdot \theta \cdot \sin\phi = r \cdot \alpha$$

$$r \cdot \cos\phi \cdot \sin\theta = r \cdot \theta \cdot \cos\phi = r \cdot \beta$$

In other words, the moving amounts are proportional to the apex angles in the pitch and yaw directions. Therefore, by detecting the moving amounts, in the direction of the plane of the drawing of FIG. 14, of the points A and B, the apex angles in the pitch and yaw directions can be independently detected.

The moving amounts, in the direction of the plane of the drawing of FIG. 14, of the points A and B are detected by the above-mentioned actuators 238 and the Hall elements 239 (suffices P and Y indicating the pitch and yaw directions are omitted).

Figure 15:
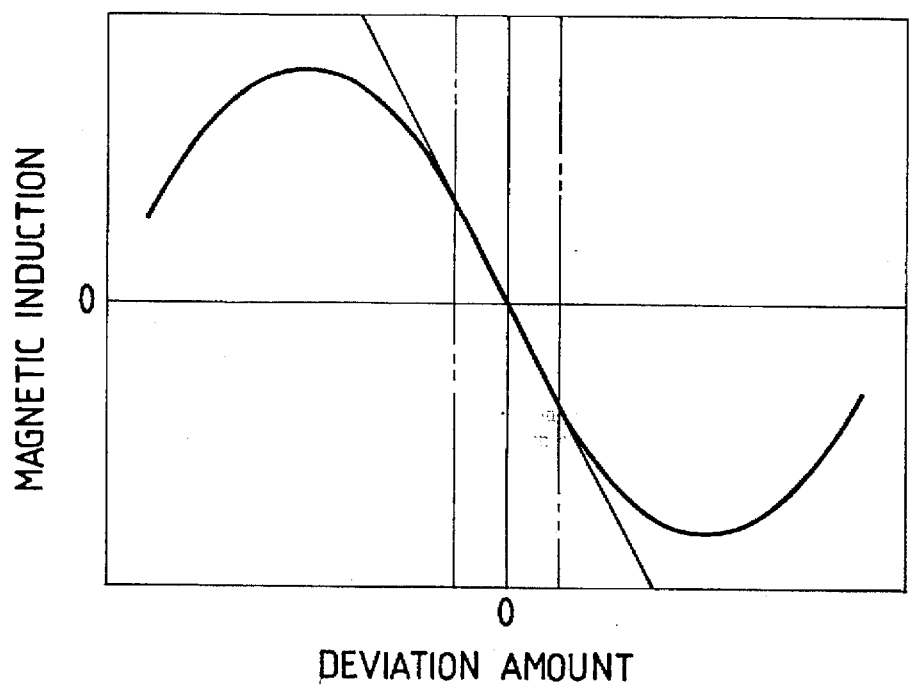
FIG. 15 is a graph showing the relationship between the gap of an actuator and the magnetic induction distribution in the vertical direction in the third embodiment of the present invention.

FIG. 15 shows the magnetic induction distribution in a direction perpendicular to the gap of the actuator 238. In FIG. 15, the deviation in the moving direction of the Hall element is plotted along the abscissa, and the magnetic induction is plotted along the ordinate.

In the range of the deviation amount defined by alternate long and two short dashed lines, a change in magnetic inductance can be regarded to be substantially linear, and the Hall element oscillates within this range. Since the Hall element can generate an electrical output proportional to the magnetic inductance, the apex angle detection means is constituted by a combination of the actuator and the Hall element, and can obtain an electrical signal proportional to the apex angle formed by the variable apex angle prism 231.

Figure 16:
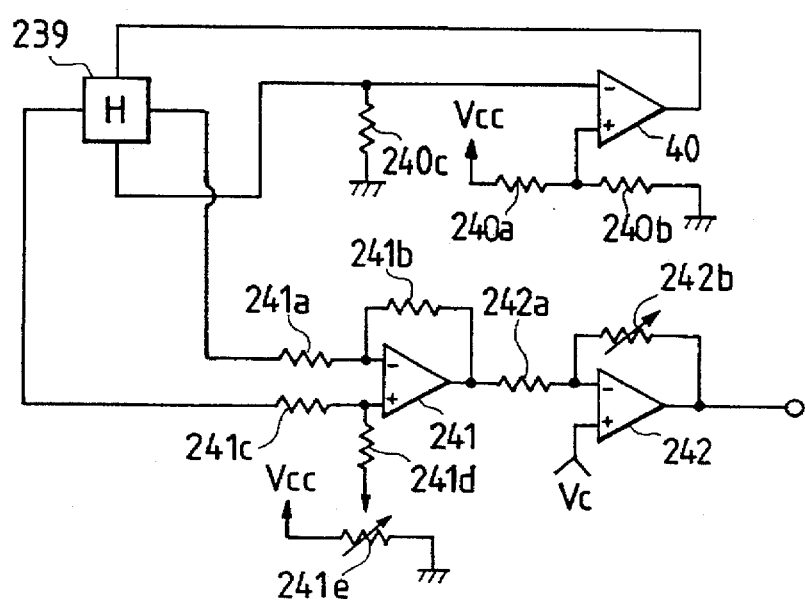
FIG. 16 is a circuit diagram showing a signal processing circuit of a Hall element in the third embodiment of the present invention.

FIG. 16 shows a signal processing circuit of the Hall element.

Referring to FIG. 16, the Hall element 239 is connected to an operational amplifier 240, which is combined with resistors 240a to 240c to supply a constant current to the Hall element 239. An output corresponding to the magnetic field strength (magnetic induction) of the Hall element 239 is differentially amplified by an operational amplifier 241, and resistors 241a, 241b, 241c, and 241d. A variable resistor 241e can shift an output corresponding to the magnetic field strength by changing its resistance. The resistance of the variable resistor 241e is adjusted, so that the output from the resistor 241e becomes equal to a reference voltage $V_c$ (zero point of control) when the apex angle formed by the variable apex angle prism is zero, i.e., the two surfaces are parallel to each other. An operational amplifier 242 is combined with resistors 242a and 242b to inversely amplify the output from the operational amplifier 241 to have the reference voltage $V_c$ as the center. By changing the resistance of the variable resistor 242b, the ratio of a change in output voltage from the operational amplifier 242 to a change in magnetic field strength is adjusted to a predetermined value.

In the third embodiment as well, when the same control means as that in the block diagram shown in FIG. 11 of the second embodiment is arranged in correspondence with the pitch and yaw directions, image blur correction in an arbitrary direction in the pitch and yaw directions can be realized by driving only one surface of the variable apex angle prism 231.

(Fourth Embodiment)

Figure 17:
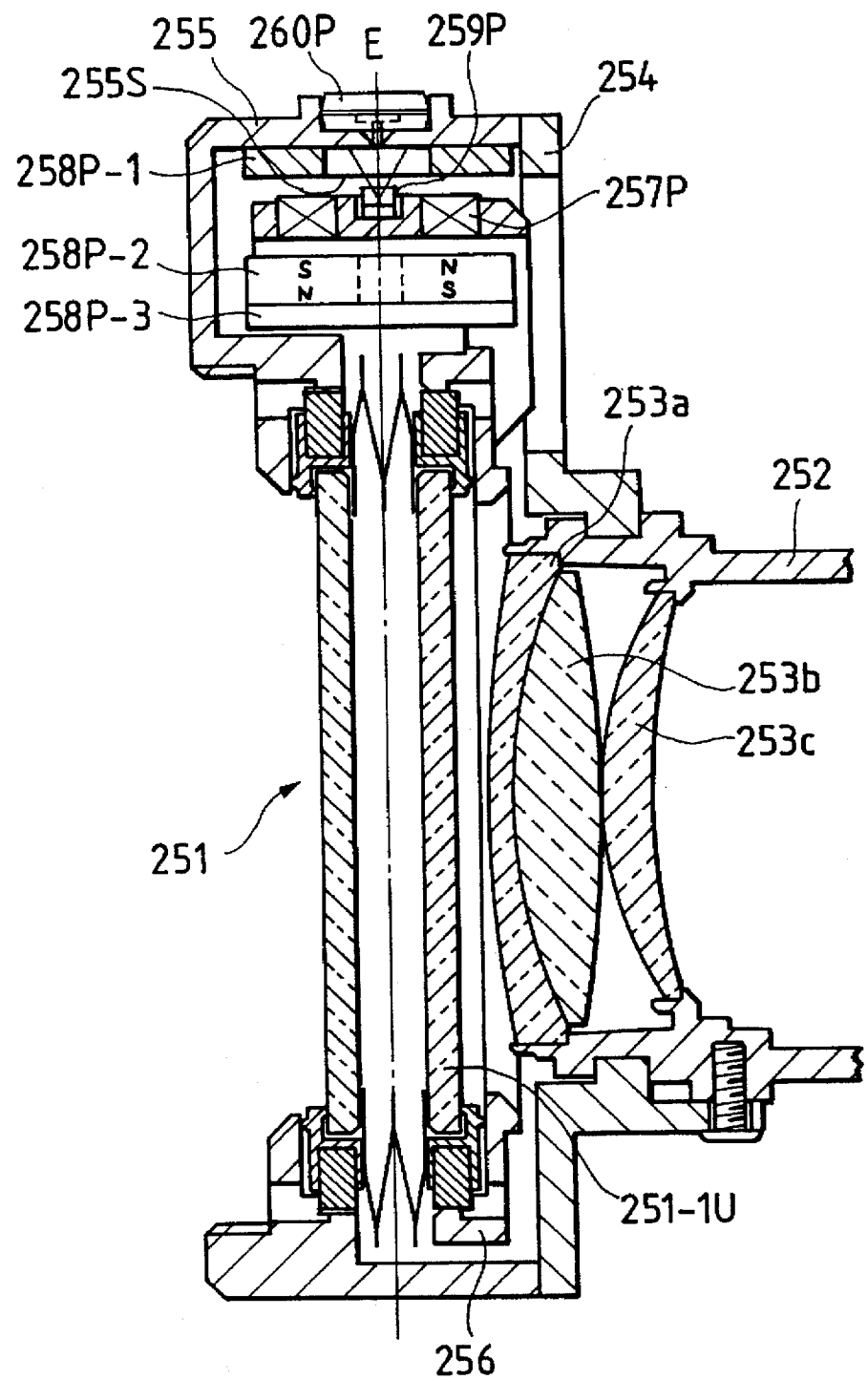
FIG. 17 is a sectional view showing a principal part of an image blur correction apparatus according to the fourth embodiment of the present invention.
Figure 19:
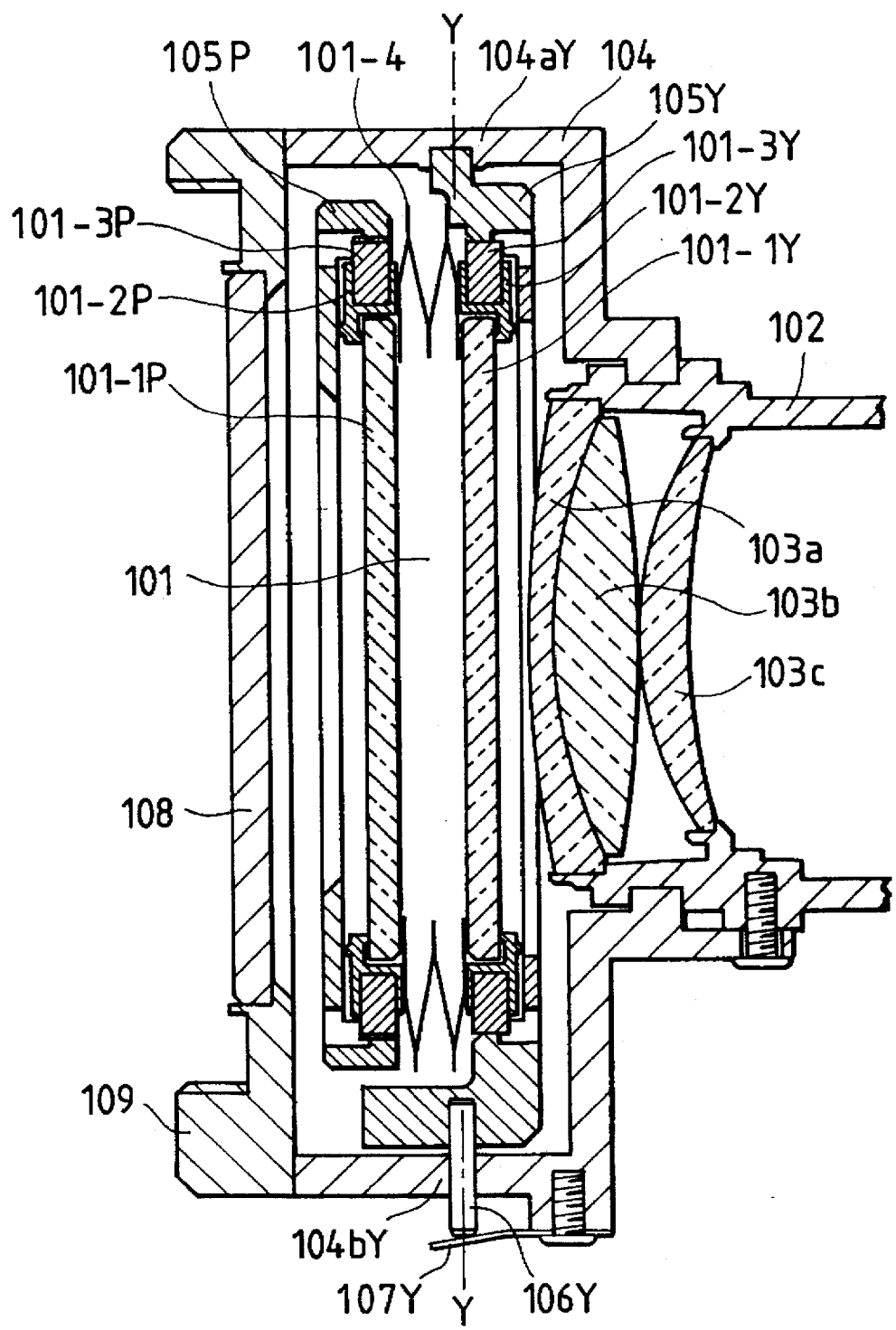
FIG. 19 is a sectional view showing a principal part of a conventional image blur correction apparatus.

FIG. 17 is a sectional view showing a principal part of the fourth embodiment in which the present invention is applied to an image blur correction apparatus for an optical equipment such as a video camera.

Referring to FIG. 17, a lens barrel in which the image blur correction apparatus using a variable apex angle prism 251 is to be assembled has a portion 252 which includes lenses 253a, 253b, and 253c of lens groups of an optical system of the lens barrel. A support member 254 is fixed to the lens barrel 252. A fixing frame 255 fixes one surface of the variable apex angle prism 251 to the support member 255, and a support frame 256 is fixed to the other movable surface 251-1U of the variable apex angle prism.

Coils 257P and 257Y (not shown) are fixed by, e.g., an adhesive to the support frame 256 to form a right angle therebetween. An upper yoke 258P-1, a magnet 258P-2, and a lower yoke 258P-3 as a back yoke of the magnet 258P-2 are arranged on the two surfaces of the coil 257P to have a given gap therebetween so as to form a magnetic circuit, thus constituting an actuator 258P (the upper yoke and the magnet are held by a space member (not shown)). When the coil 257P is energized, a Lorentz force is generated to drive the support frame 256. An actuator 258Y (not shown) with the same arrangement as above is arranged on the coil 257Y, and a synthesized force of the actuators 258P and 258Y acts on the support frame 256.

An iRED 259P emits infrared light, and is fixed to the support frame 256. A PSD 260P receives infrared light from the iRED 259P. The infrared light emitted from the iRED 259P passes through a hole portion 258P-1a formed in the central portion of the upper yoke 258P-1, is focused by a slit opening portion 255S formed in the fixing frame 256, and is then irradiated onto the PSD 260P, thus obtaining a position output.

The above-mentioned arrangement constitutes an apex angle detection means in the pitch direction, and an apex angle detection means (not shown) with the same arrangement is also arranged in the yaw direction. The detection axes of these detection means are arranged in the vicinity of a plane including the oscillation axis of the movable surface of the variable apex angle prism 251 and perpendicular to the optical axis so as to form an angle of 90° therebetween.

With this arrangement, the apex angles, in the pitch and yaw directions, of the variable apex angle prism can be independently detected for the same reason as has been described above with reference to FIG. 15 in the third embodiment.

The mechanism of apex angle detection will be explained below with reference to FIGS. 18A and 18B. The same reference numerals in FIGS. 18A and 18B denote the same parts as in FIG. 17. Note that suffixes P and Y indicating the pitch and yaw directions are omitted.

FIG. 18A shows a case wherein the support frame 256 including the iRED 259 is located at a reference position. In this state, a light beam emitted from the iRED 259 is focused by the slit opening portion 255S formed in the fixing frame 255, and is irradiated onto the center of the light-receiving surface of the PSD. The iRED 259, the slit opening portion 255S, and the PSD 260 are arranged in the vicinity of a plane (indicated by an alternate long and short dashed line E) which includes the oscillation axis of the movable surface of the variable apex angle prism and is perpendicular to the optical axis.

FIG. 18B shows a state wherein the holding frame 256 oscillates by an angle δ about an oscillation axis R. As shown in FIG. 18B, a light beam emitted from the iRED 259 and passing through the slit opening portion 255S is obliquely incident into the PSD 260, and is irradiated at a position separated by X from the center on the light-receiving portion. The PSD 260 generates a change in output proportional to this position.

In this embodiment as well, when the same control means as that in the block diagram shown in FIG. 11 of the second embodiment is arranged in correspondence with the pitch and yaw directions, image blur correction in an arbitrary direction in the pitch and yaw directions can be realized by driving only one surface of the variable apex angle prism.

As described above, according to each of the second to fourth embodiments, the apparatus comprises: apex angle detection means, arranged in the vicinity of a plane including the oscillation axis of the movable surface of a variable apex angle prism and perpendicular to the optical axis, for detecting apex angles in two-dimensional directions of the variable apex angle prism; and control means for controlling driving means on the basis of apex angle signals obtained from the apex angle detection means and a driving target position signal of the variable apex angle prism to drive one movable surface of the variable apex angle prism to the driving target position, wherein the prism apex angle can be arbitrarily varied by driving only one surface of the variable apex angle prism.

Therefore, the apparatus can be made compact, and cost can be reduced by decreasing the number of parts and the number of assembling steps.

The present invention is not limited to the arrangements of these embodiments, and may adopt any other arrangements as long as functions presented by appended claims or functions of the embodiments can be achieved.

In each of the above embodiments, the vibration gyro as an angular velocity sensor is used as a blur detection means. However, any other sensors such as an angular acceleration sensor, an acceleration sensor, a velocity sensor, an angular deviation sensor, a deviation sensor, a method of detecting an image blur itself, and the like may be adopted as long as a blur can be detected.

In each of the above embodiments, two driving means for performing driving operations in the pitch and yaw directions, respectively, are arranged as the driving means of a variable apex angle prism. However, three or more driving means may be arranged.

According to the present invention, the blur detection means and the variable apex angle prism (including driving means) may be separately arranged in a plurality of apparatuses which can be attached to each other, e.g., a camera and an exchangeable lens which can be attached to the camera.

According to the present invention, the arrangements of appended claims or the embodiments or some components of the arrangement may be arranged in independent apparatuses. For example, the blur detection means may be arranged in a camera body, the variable apex angle prism (including driving means) may be arranged in a lens barrel to be attached to the camera, and the control means for controlling them may be arranged in an intermediate adapter.

Furthermore, the present invention is not limited to applications to cameras such as a single-lens reflex camera, a lens-shutter camera, a video camera, and the like, but may be applied to optical equipments such as binoculars, or other devices, and units constituting other apparatuses.

Furthermore, according to the present invention, the above-mentioned embodiments or their techniques may be combined.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image blur prevention apparatus comprising:
   a movable member which moves for preventing an image blur;
   a first driving apparatus which inclinedly moves said movable member in a first direction, said first driving apparatus being disposed in the vicinity of a first portion of said movable member;
   a second driving apparatus which inclinedly moves said movable member in a second direction different from the first direction, said second driving apparatus being disposed in the vicinity of a second portion of said movable member different from the first portion;
   a detection device which detects at least one of inclined movement along the first direction and inclined movement along the second direction of said movable member, said detection device being disposed in the vicinity of a third portion of said movable member which is disposed between the first portion and the second portion.

2. An apparatus according to claim 1, wherein said detection device comprises light-emitting means for emitting light, and light-receiving means for receiving the light and detecting the deviation state of said movable member on the basis of the light-receiving position.

3. An apparatus according to claim 2, wherein said light-emitting means comprises means for emitting collimated light.

4. An apparatus according to claim 3, wherein said detection device comprises slit means arranged in front of a light-receiving portion of said light-receiving means.

5. An apparatus according to claim 2, wherein said light-receiving means comprises means for receiving light reflected by reflection means for reflecting light emitted from said light-emitting means.

6. An apparatus according to claim 2, wherein said reflection means comprises means which is deviated upon a deviation of said movable member.

7. An apparatus according to claim 6, wherein said reflection means comprises means to be integrally arranged on said movable member.

8. An apparatus according to claim 2, wherein said light-emitting means comprises means which is deviated upon a deviation of said movable member.

9. An apparatus according to claim 8, wherein said reflection means comprises means to be integrally arranged on said movable member.

10. An apparatus according to claim 1, wherein said detection device comprises magnetic field generation means for generating a magnetic field, and magnetic field detection means for detecting a state of the magnetic field.

11. An apparatus according to claim 10, wherein said magnetic field detection means comprises means which is deviated upon a deviation of said movable member.

12. An apparatus according to claim 11, wherein said magnetic field detection means comprises means to be integrally arranged on said movable member.

13. An apparatus according to claim 1, wherein said detection device comprises means for detecting a movement state of the third portion.

14. An apparatus according to claim 13, wherein the third portion is a portion of which movement corresponding to the inclined movement along the first direction is changed by changing a state of the inclined movement along the second direction, and said detection device comprises means for detecting a state of the inclined movement along the first direction independently of the change of the state of the inclined movement along the second direction.

15. An apparatus according to claim 14, wherein the third portion is a portion in which a positional relationship to said detection device is changed by changing the state of the inclined movement along the second direction, and said detection device comprises means for detecting the state of the inclined movement along the first direction independently of the change of the positional relationship.

16. An apparatus according to claim 1, wherein said first driving apparatus comprises means for rotatably moving said movable member around a first axis, and said second driving apparatus comprises means for rotatably moving said movable member around a second axis different from the first axis.

17. An apparatus according to claim 1, wherein said movable member comprises an optical member.

18. An apparatus according to claim 17, wherein said movable member comprises means for deflecting a light beam to a third direction by the inclined movement along the first direction and for deflecting the light beam to a fourth direction different from the third direction by the inclined movement along the second direction.

19. An apparatus according to claim 1, wherein said movable member comprises means for preventing the image blur in a third direction by the inclined movement along the first direction and for preventing the image blur in a fourth direction different from the third direction by the inclined movement along the second direction.

20. An apparatus according to claim 1, wherein said movable member is substantially circular shaped, and wherein the first portion and the second portion are disposed on a circumference of said movable member and the third portion is disposed on a shorter one of two circumferential portions of the circumference of said movable member which extend between the first portion and the second portion.

21. An apparatus according to claim 1, wherein said first driving apparatus comprises means which is integrally provided to said movable member at the first portion, and said second driving apparatus comprises means which is integrally provided to said movable member at the second portion.

22. An apparatus according to claim 17, wherein said movable member comprises a variable apex angle prism.

23. An optical apparatus comprising:
   a movable member which moves for preventing an image blur;
   a first driving apparatus which inclinedly moves said movable member in a first direction, said first driving apparatus being disposed in the vicinity of a first portion of said movable member;
   a second driving apparatus which inclinedly moves said movable member in a second direction different from the first direction, said second driving apparatus being disposed in the vicinity of a second portion of said movable member different from the first portion;
   a detection device which detects at least one of inclined movement along the first direction and inclined movement along the second direction of said movable member, said detection device being disposed in the vicinity of a third portion of said movable member which is disposed between the first portion and the second portion.

24. A light deflection apparatus, comprising:
   an optical member rotatable around both a first axis and a second axis which is different from said first axis; and
   a detection device which is disposed on said second axis to detect the state of rotation of said optical member around the first axis.

25. An apparatus according to claim 24, wherein said optical member includes a member which is integrally formed with said optical member and said detection device includes means for detecting a rotation state of a predetermined portion of said member on said second axis.

26. An apparatus according to claim 25, wherein said optical member includes a frame member which holds said optical member, and said detection device includes means for detecting a rotation state of a predetermined portion of said frame member on said second axis.

27. An apparatus according to claim 24, wherein said optical member is constituted by two optical members, a deformable portion and a substance that fills in a space formed by said two optical members and said deformable portion.

28. An apparatus according to claim 24, wherein at least a part of said detection device is disposed on the second axis.

29. An apparatus according to claim 28, wherein said at least part of said detection device is substantially integrated with said optical member on the second axis.

30. An apparatus according to claim 28, wherein said detection device includes a detection element disposed on the second axis.

31. An apparatus according to claim 28, wherein said detection device includes a detection element and a portion to be detected by said detection element.

32. An apparatus according to claim 24, wherein said detection device includes means for detecting a state of magnetic field.

33. An apparatus according to claim 24, wherein said detection device includes a light emission device and a light receiving device.

34. An apparatus according to claim 24, further comprising a driving device which rotates said optical member around said first axis.

35. An apparatus according to claim 34, wherein said driving device is disposed at a portion substantially the same as said detection device.

36. An apparatus according to claim 34, wherein said driving device includes means for generating a driving force by using a magnetic field and said detection device includes means for detecting the movement of said optical member by using the magnetic field.

37. An apparatus according to claim 24, further comprising a second detection device disposed on the first axis for detecting a rotation state of said optical member around the second axis.

38. An image blur prevention apparatus, comprising:

an optical member rotatable around both a first axis and a second axis which is different from said first axis; and a detection device which is disposed on said second axis to detect the state of rotation of said optical member around the first axis.

* * * * *

UNITED STATES PATENT AND TRADEMARK OFFICE
CERTIFICATE OF CORRECTION

PATENT NO. : 5,689,369
DATED : November 18, 1997
INVENTOR(S) : KAZUHIRO NOGUCHI

It is certified that error appears in the above-identified patent and that said Letters Patent is hereby corrected as shown below:

<u>Column 2</u>

Line 2, "surface" should read --surfaces--.

<u>Column 11</u>

Line 48, "suffices" should read --suffixes--.

<u>Column 14</u>

Line 49, "portion;" should read --portion; and--.

<u>Column 16</u>

Line 24, "portion;" should read --portion; and--.

Signed and Sealed this

Nineteenth Day of May, 1998

Attest:

BRUCE LEHMAN

Attesting Officer

Commissioner of Patents and Trademarks